United States Patent [19]

Rimondini et al.

[11] 4,152,670

[45] May 1, 1979

[54] SIGNAL GENERATOR, ESPECIALLY FOR RINGING CURRENT IN TELECOMMUNICATION SYSTEM

[75] Inventors: Augusto Rimondini, Milan; Giuseppe Balzarini, Sesto Calende, both of Italy

[73] Assignee: Societa Italiana Telecomunicazioni Siemens S.p.A., Milan, Italy

[21] Appl. No.: 877,612

[22] Filed: Feb. 14, 1978

[30] Foreign Application Priority Data

Feb. 14, 1977 [IT] Italy ............................... 20252 A/77

[51] Int. Cl.$^2$ ............................................ H04M 3/02
[52] U.S. Cl. ............................. 331/61; 179/18 HB; 330/10; 332/14
[58] Field of Search ..................... 179/18 HB; 331/61; 330/10; 332/14

[56] References Cited

U.S. PATENT DOCUMENTS

| | | | |
|---|---|---|---|
| 4,016,501 | 4/1977 | Jasinski et al. | 330/10 |
| 4,059,807 | 11/1977 | Hamada | 330/10 |
| 4,092,610 | 5/1978 | White et al. | 330/10 |

Primary Examiner—John Kominski
Attorney, Agent, or Firm—Karl F. Ross

[57] ABSTRACT

A circuit arrangement for feeding a sinusoidal signal current to a wide range of loads, such as ringing current transmitted over subscriber lines from a telephone exchange, comprises a modulator which converts a rectified sine wave into a sequence of unipolar constant-amplitude pulses of varying width controlling, through a logic network, the energization of a load impedance via a resonant circuit from a d-c source. A switchover unit, including a transistor bridge having a diagonal connected across the d-c source, receives command signals from the logic network in response to the control pulses and to the outputs of two sensors determining the instant polarities of the load voltage and the load current in the output of the resonant circuit. The switchover unit produces a train of bipolar driving pulses, of constant amplitude and synchronized with the control pulses, whose polarity changes with alternate half-cycles of the sine wave fed in rectified form to the modulator.

10 Claims, 8 Drawing Figures

SIGNAL GENERATOR, ESPECIALLY FOR RINGING CURRENT IN TELECOMMUNICATION SYSTEM

FIELD OF THE INVENTION

Our present invention relates to a sine-wave generator, particularly for producing a ringing signal transmitted to a called subscriber station of a telephone or other telecommunication system.

BACKGROUND OF THE INVENTION

Static equipment including electronic components is now extensively used in telephone exchanges together with traditional electromechanical relay contacts to produce ringing signals (usually of 25 Hz) transmitted over subscriber lines to respective stations in response to digit-selection signals received by the exchange from calling subscribers. In the present state of the art, a ringing-signal generator normally comprises a pilot oscillator working into an amplification stage stabilized by negative feedback, the amplifier furnishing an output signal of the desired power characteristics. Two disadvantages of this arrangement are the low efficiency of such an amplifier and the large-size output transformer required to raise the voltage of the outgoing signal. Another conventional ringing-signal generator produces a stepped wave approximating a sinusoid, e.g. by connecting different taps of a transformer secondary in cyclic succession to an amplifier, this stepped wave being fed to a low-pass filter stage deriving a roughly sinusoidal voltage therefrom. Although such a device performs satisfactorily, the harmonics content of its output voltage is significant even with a high number of steps in the unfiltered waveform. Another shortcoming of the last-mentioned device is its relative inflexibility in the face of variations in load.

OBJECTS OF THE INVENTION

An object of our present invention is to provide an efficient circuit arrangement for energizing widely varying, at least partly reactive loads (such as subscriber lines emanating from a telephone exchange) with a sinusoidal waveform of high spectral purity.

Another object of our invention is to provide a sine-wave generator of this character readily adapting itself to changes in load.

SUMMARY OF THE INVENTION

We realize these objects, in accordance with our present invention, by the provision of oscillation-generating means for producing a fundamental sine wave fed to a modulator which converts it into a sequence of unipolar control pulses of constant amplitude varying in width with the amplitude of the sine wave. The control pulses have a cadence, or recurrence frequency, which is substantially higher than the sine-wave frequency and is preferably harmonically related thereto, as by being derived from a common pilot oscillator. A switchover unit, connected across a source of direct current, is operated by logical circuitry to produce a train of bipolar driving pulses of constant amplitude which are synchronized with the aforementioned control pulses but whose polarity reverses with alternate half-cycles of the sine wave, this logical circuitry being provided for that purpose with input connections to the modulator emitting the control pulses and to the oscillation-generating means itself; the latter connection may include a voltage sensor determining the instantaneous polarity of the fundamental sine wave. The switchover unit works into a load circuit including low-pass filter means for deriving from the emitted driving pulses a sinusoidal output voltage in step with the fundamental sine wave and a sinusoidal output current offset from the voltage by a load-dependent phase angle (which could be zero in specific instances). The switchover unit provides a flow path for the output current under all operating conditions, thereby preventing the appearance of undesirable transients.

In order to maintain the continuity of the flow path over a wide range of phase angles, another feature of our invention resides in the provision of a current sensor connected to the load circuit for detecting the instantaneous polarity of the output current, this current sensor working into the logical circuitry for modifying the operation of the switchover unit during periods when the output voltage and the output current have opposite polarities.

Pursuant to a more specific feature of our invention, the switchover unit comprises a bridge with four arms each including a transistor and a diode in antiparallel relationship therewith. The logical circuitry is a network with a set of coincidence (AND, NAND and/or possibly NOR) gates receiving the control pulses together with polarity-dricriminating signals from the two sensors for continuously unblocking a first transistor during a first time interval in which the output voltage and the output current are both positive, unblocking a second transistor diagonally opposite the first one during the same time interval in the presence of a control pulse whereby current from the d-c source flows in one direction through the load circuit as a positive driving pulse, continuously unblocking a third transistor during a second time interval in which the output voltage and the output current are both negative, and unblocking a fourth transistor (diagonally opposite the third one) during the last-mentioned time interval in the presence of a control pulse whereby current from the source traverses the load circuit in an opposite direction as a negative driving pulse. During a third time interval, in which the output voltage is positive while the input voltage is negative, as well as during a fourth time interval in which the reverse is true, all transistors are blocked in the presence of a control pulse. If a control pulse is absent, only the fourth transistor is unblocked during the third time interval whereas only the second transistor is unblocked in the fourth time interval.

The oscillation-generating means may comprise a pilot oscillator, preferably a square-wave generator, connected to a pair of circuit branches for producing the fundamental sine wave and a triangular carrier wave whose frequency is a multiple of that of the fundamental wave. These two circuit branches work into respective inputs of the modulator designed as a binary comparator.

In utilizing our invention for the purpose here primarily contemplated, i.e. to generate ringing currents in a telephone or other telecommunication system, the fundamental sine wave should have a frequency in the low audio range, on the order of 25 Hz. It should be noted, however, that other applications are possible for which that frequency could be different.

BRIEF DESCRIPTION OF THE DRAWING

These and other features of our present invention will now be described in detail, reference being made to the accompanying in which.

SPECIFIC DESCRIPTION

Figure 1:
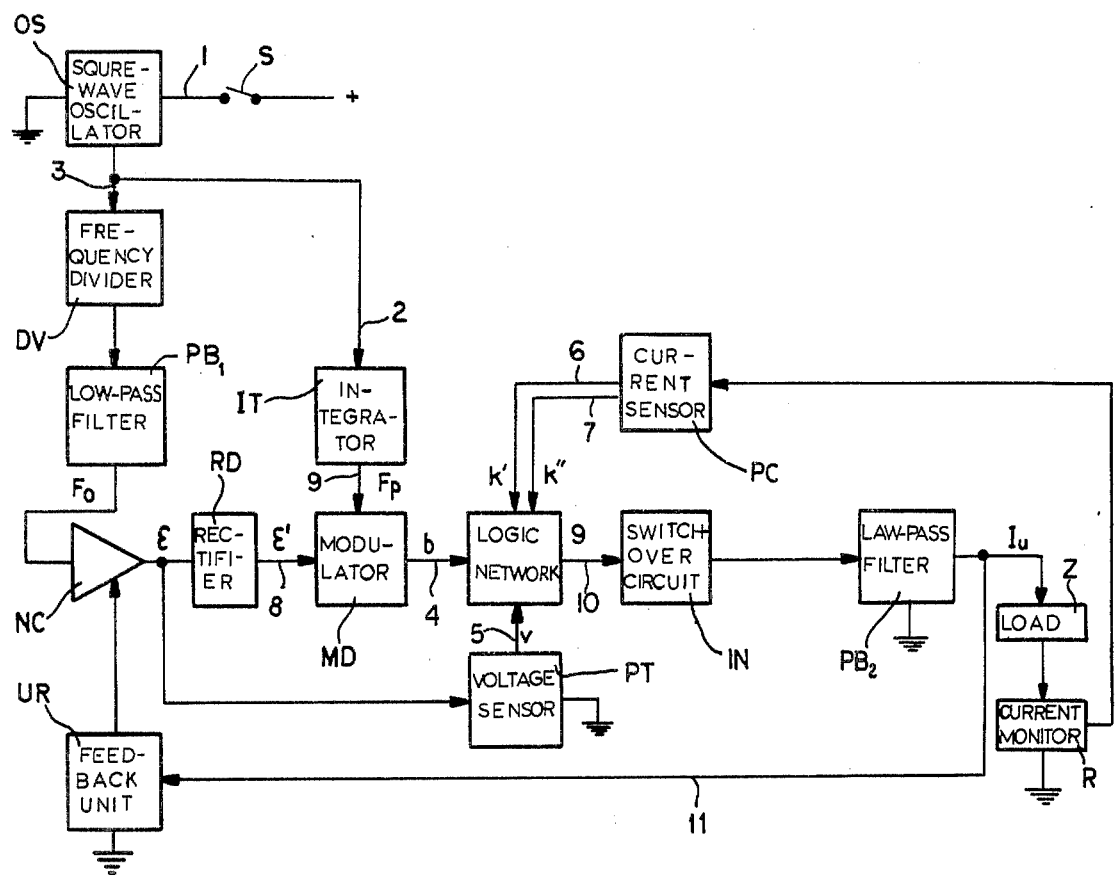
FIG. 1 is a block diagram illustrating a signal generator according to our present invention.

In FIG. 1 we have shown a circuit arrangement according to our present invention for generating a sinusoidal signal minimally distorted by harmonics even in the presence of varying load conditions. Such a signal generator may be linked to a switching network in a telephone exchange for intermittently sending a ringing current over outgoing subscriber lines identified by incoming dial pulses or equivalent digital selection signals.

A square-wave oscillator OS shown in FIG. 1, with an energizing lead 1 controlled by a switch S, has two output leads 2, 3 respectively extending to an integrator IT in one branch circuit and a frequency divider DV in cascade with a low-pass filter stage $PB_1$ in another branch circuit. A 25-Hz sine wave $F_o$ of high spectral purity is transmitted from filter stage $PB_1$ to an amplitude stabilizer NC which feeds a sinusoidal voltage $\epsilon$ in phase therewith to a full-wave rectifier RD working into one input of a modulator MD whose second input receives a triangular waveform $F_p$ from integrator IT. Waveform $F_p$, illustrated in graph (a) of FIG. 8 along with a rectified sine wave $\epsilon'$ delivered to modulator MD by component RD, is harmonically related to sine wave $F_o$, owing to their common origin, and is consequently in phase with sine wave $\epsilon'$ at the beginning of each half-cycle. Voltage $F_p$, whose frequency equals the operating frequency of pilot oscillating OS, is a carrier signal which is pulse-width modulated by unit MD according to the rectified sine wave $\epsilon'$ to produce a sequence of control pulses b with a recurrence frequency equal to that of carrier oscillation $F_p$ and with individual pulse durations proportional to the instantaneous amplitude of wave $\epsilon'$, as shown in graph (b) of FIG. 8. Carrier frequency $F_p$ is a high multiple of fundamental frequency $F_o$, determined by the step-down ratio of divider DV.

A logic network RL controlling a switchover unit IN receives from modulator MD, on a lead 4, the pulse sequence b and from a voltage sensor PT, on a lead 5, a binary signal v indicating the instant polarity of sinusoidal waveform $F_o$. A second sensor PC is operatively connected to a current monitor R in the output of the signal generator, lying in series with a load Z, and supplies logic network RL on two leads 6, 7 with a pair of binary polarity-discriminating signals $k'$, $k''$ indicating the instant flow direction of the output current. Network RL has an output multiple 10 carrying command signals generally designated g.

Figure 8:
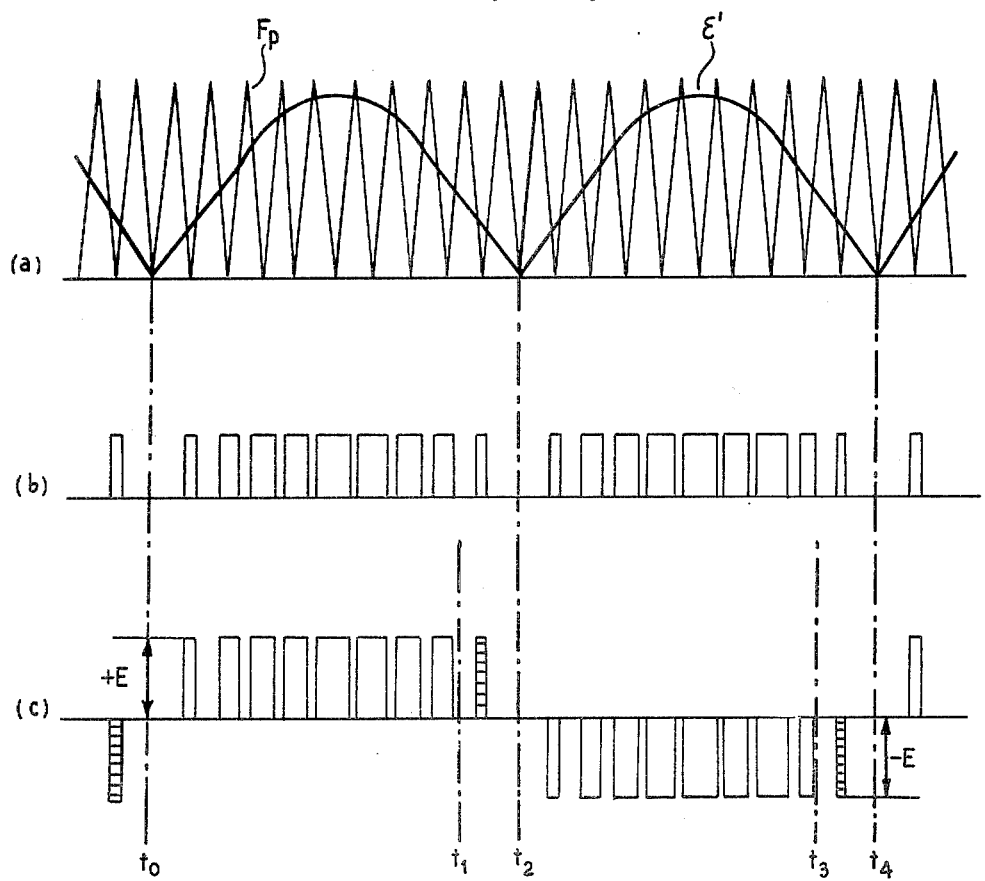
FIG. 8 is a set of graphs illustrating various waveforms occurring within the generator.

Switchover unit IN is an amplifier and selective inverter delivering to a low-pass filter $PB_2$ a pulsating bipolar voltage c, illustrated in the correspondingly designated graph of FIG. 8, which constitutes a succession of driving pulses and is derived from the unipolar pulse sequence b in a manner described hereinafter. Filter $PB_2$ converts pulse train c into a sinusoidal output voltage $v_u$, in phase with fundamental wave $F_o$, giving rise to an output current $I_u$ which may lag or lead that voltage by a phase angle depending on the load Z. Output voltage $V_u$ is transmitted to a feedback unit UR inserted in an automatic-volume-control circuit 11 between filter $PB_2$ and amplitude stabilizer NC; the latter may comprise an operational amplifier whose gain varies in inverse proportion to the magnitude of output voltage $V_u$ as integrated in unit UR.

Since the spectral purity of the output voltage $V_u$ depends on the purity of the modulating signal $\epsilon$, it is desirable to employ a rectifier RD and a filter $PB_1$ of high quality, in particular a filter $PB_1$ emitting the fundamental $F_o$ with accurately spaced zero crossings. We prefer to use for stage $PB_1$ an active fifth-order Butterworth filter, characterized by an attenuation of about 60 dB on the third harmonic.

Figure 2:
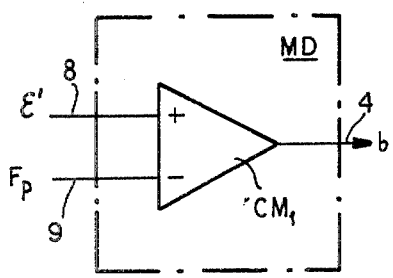
FIG. 2 is a more detailed circuit diagram of a modulator included in the signal generator of FIG. 1.

As illustrated in FIG. 2, modulator MD comprises a binary comparator $CM_1$ receiving on inputs 8 and 9 the rectified sine wave $\epsilon'$ and the triangular waveform $F_p$. Its output voltage, constituting the control pulses b on lead 4, has the logic level "1" whenever the instantaneous amplitude of wave $\epsilon'$ is greater than that of carrier oscillation $F_p$, being otherwise of logic level "0;" see FIG. 8, graphs (a) and (b). The high degree of modulation, with a pulse duration ranging from near-zero to almost the entire period of carrier $F_p$, minimizes the harmonics content in the output voltage c of switchover unit IN.

Figure 3:
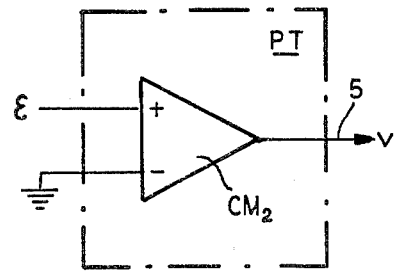
FIG. 3 is a more detailed circuit diagram of a voltage sensor forming part of that signal generator.

FIG. 3 shows the voltage sensor PT as comprising a binary comparator $CM_2$ having an inverting input connected to a fixed potential (ground) and a noninverting input energized by stabilizer NC for detecting the instantaneous polarity of sine wave $\epsilon$. Sensor PT produces a square wave whose high-level periods coincide with the positive half-cycles of wave $\epsilon$.

Figure 4:
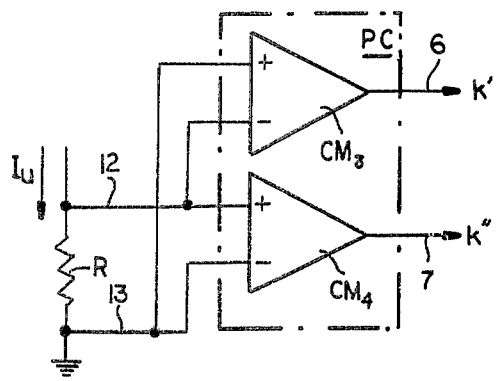
FIG. 4 is a more detailed diagram of a current sensor also included in the generator of FIG. 1.
Figure 6:
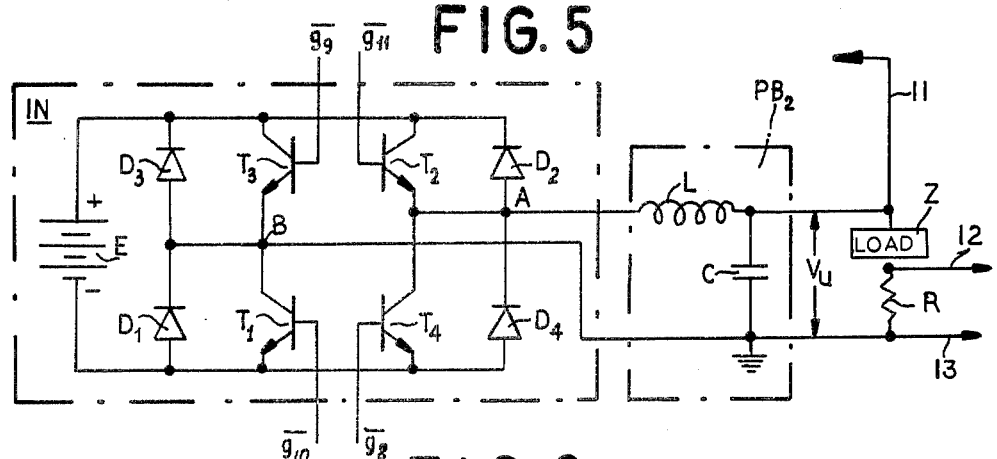
FIG. 6 is a circuit diagram of a switchover unit likewise illustrated in block form in FIG. 1.

As depicted in FIG. 4, current sensor PC includes a pair of binary comparators $CM_3$, $CM_4$ with inputs fed by two leads 12, 13 connected across the small current-monitoring resistor R connected in series with load Z (FIGS. 1 and 6). With lead 13 grounded, comparator $CM_3$ generates on lead 6 the binary negative-polarity signal $k'$ having a logic level "1" whenever lead 12 carries a voltage which is either equal to or less than zero; comparator $CM_4$ generates on lead 7 the binary positive-polarity signal $k''$ having a logic level "1" if the voltage on lead 12 is greater than or equal to zero. Thus, in the case of zero output current ($I_u = 0$) the levels of discriminating signals $k'$, $k''$ are both "1;" in all other instances the logic levels of these two signals are mutually complementary. This has been summarized below:

TABLE 1

| $I_u$ | $k''$ | $k'$ |
|---|---|---|
| positive | 1 | 0 |
| negative | 0 | 1 |

TABLE 1-continued

| $I_u$ | k″ | k′ |
|---|---|---|
| absent | 1 | 1 |

Figure 5:
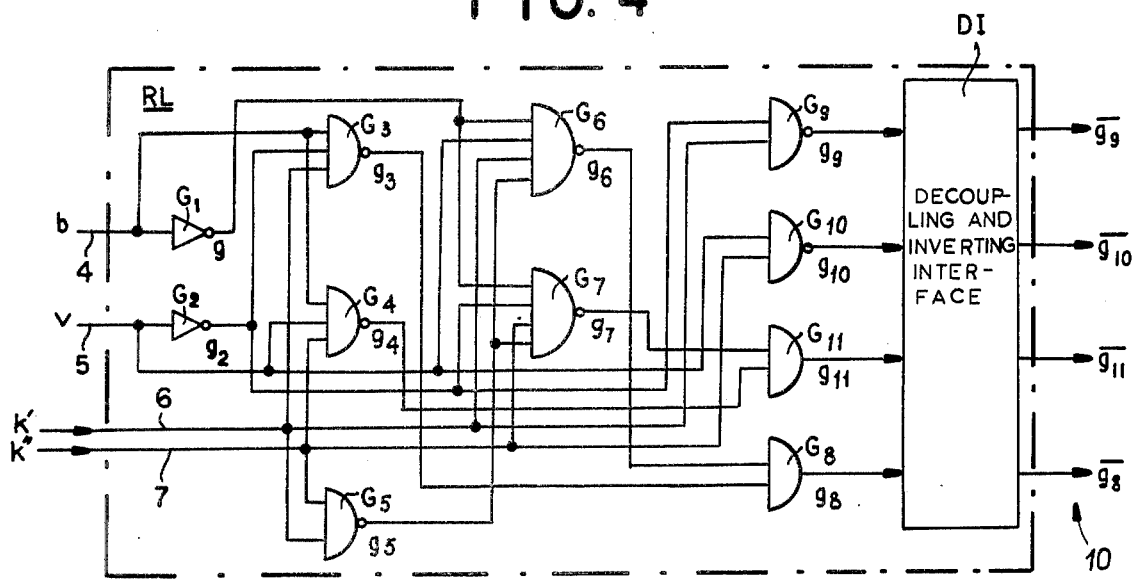
FIG. 5 is a circuit diagram showing details of a logic network illustrated in block form in FIG. 1.

As illustrated in detail in FIG. 5, logic network RL comprises a set of gates $G_1$–$G_{11}$ generating respective output signals $g_1$–$g_{11}$. Gates $G_1$, $G_2$ invert the control pulses b on lead 4 and the voltage-polarity signal v on lead 5 to produce signals $g_1 = \bar{b}$, $g_2 = \bar{v}$ which are respectively delivered to NAND gates $G_6$, $G_7$ and $G_3$, $G_4$. Pulse sequence b is also fed to NAND gates $G_3$, $G_4$ having further inputs respectively connected to leads 6 and 7 for receiving the current-polarity signals k′ and k″ from comparators $CM_3$ and $CM_4$ of FIG. 4. NAND gates $G_9$ and $G_{10}$ are fed by signals $g_2$, k′ and v, k″, respectively, while AND gates $G_8$ and $G_{11}$ receive signals $g_3$, $g_6$ and $g_4$, $g_7$. Thus, the output signals of coincidence gates $G_8$–$G_{11}$ are as follows:

$$g_8 = \overline{\bar{b} \cdot v \cdot k' \cdot \overline{k' \cdot k''}} \cdot \overline{b \cdot v \cdot k'}$$

$$g_9 = \overline{\bar{v} \cdot k'}$$

$$g_{10} = \overline{v \cdot k''}$$

$$g_{11} = \overline{\bar{b} \cdot v \cdot k'' \cdot \overline{k' \cdot k''}} \cdot \overline{b \cdot v \cdot k''}$$

The current-polarity signals k′, k″ are also conducted to respective inputs of NAND gate $G_5$ whose output signal $g_5 = \overline{k'k''}$ is fed to additional inputs of NAND gates $G_6$, $G_7$. An inverting interface unit DI within logic network RL, having also a decoupling function, generates the complements of signals $g_8$–$g_{11}$ as follows:

$$\overline{g_8} = \bar{b} \cdot v \cdot k' \cdot \overline{k' \cdot k''} + b \cdot v \cdot k'$$

$$\overline{g_9} = \bar{v} \cdot k'$$

$$\overline{g_{10}} = v \cdot k''$$

$$\overline{g_{11}} = \bar{b} \cdot v \cdot k'' \cdot \overline{k' \cdot k''} + b \cdot v \cdot k''$$

Binary voltages $\overline{g_{10}}$, $\overline{g_{11}}$, $\overline{g_9}$ and $\overline{g_8}$ are the command signals g transmitted over four leads of multiple 10 to switchover unit IN for the purpose of controlling the conduction of respective transistors $T_1$, $T_2$, $T_3$ and $T_4$ forming part of the four arms of a bridge circuit, each arm further including a diode $D_1$, $D_2$, $D_3$ and $D_r$ connected in antiparallel relationship with the corresponding transistor. One of the bridge diagonals is connected across a source of direct current E; the other diagonal is defined by two terminals A and B, the latter being grounded whereas terminal A is connected via low-pass filter $PB_2$ to the load Z and the small monitoring resistor R in series therewith. Filter $PB_2$ is here shown as a simple resonant circuit tuned to the operating frequency of 25 Hz, comprising a series inductance L and a shunt capacitance C.

The normally nonconductive NPN transistors $T_1$–$T_4$ are saturated whenever their respective base leads are energized by signals $\overline{g_{10}}$, $\overline{g_{11}}$, $\overline{g_9}$ and $\overline{g_8}$. The following Table 2 shows the binary values of these command signals for different combinations of input variables v, k′ and k″, occurring during various time periods of an operating cycle illustrating in FIG. 7.

TABLE 2

|  | v | k″ | k′ | $g_8(T_4)$ | $g_9(T_3)$ | $g_{10}(T_1)$ | $g_{11}(T_2)$ |
|---|---|---|---|---|---|---|---|
| $t_0$–$t_1$ | 1 | 1 | 0 | 0 | 0 | 1 | b |

TABLE 2-continued

|  |  | v | k″ | k′ | $g_8(T_4)$ | $g_9(T_3)$ | $g_{10}(T_1)$ | $g_{11}(T_2)$ |
|---|---|---|---|---|---|---|---|---|
| $I_u \neq 0$ | $t_2$–$t_3$ | 0 | 0 | 1 | b | 1 | 0 | 0 |
|  | $t_1$–$t_2$ | 1 | 0 | 1 | $\bar{b}$ | 0 | 0 | 0 |
|  | $t_3$–$t_4$ | 0 | 1 | 0 | 0 | 0 | 0 | b |
| $I_u = 0$ | $t_1$ | 1 | 1 | 1 | 0 | 0 | 1 | b |
|  | $t_3$ | 0 | 1 | 1 | b | 1 | 0 | 0 |

The last two rows of Table 2 relate to the situation of zero output current $I_u$, which is normally the case during the start-up of the signal generator upon closure of switch S (FIG. 1).

Figure 7:
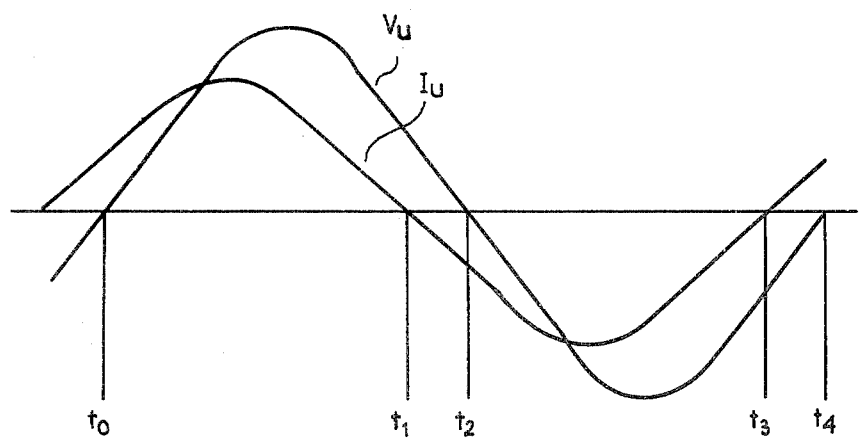
FIG. 7 is a graph of the output voltage and the output current of the signal generator of FIG. 1.

FIG. 7 shows output voltage $V_u$ and output current $I_u$ as functions of time for a capacitive load, which is typical for a ringing circuit of a telephone system. It is to be noted, however, that the device according to our invention can function no matter what the phase relationship of voltage $V_u$ and current $I_u$, i.e. with loads Z that are predominantly resistive, capacitive or inductive.

In steady-state operation, there are four principal situations determining as many working conditions of logic circuit RL: (I) the polarities of voltage and current are both positive as during a time interval $t_0$–$t_1$, (II) they are both negative as during an interval $t_2$–$t_3$, (III) the voltage is positive and the current is negative as during an interval $t_1$–$t_2$, or (IV) the voltage is negative and the current is positive as during an interval $t_3$–$t_4$. When the current and the voltage are of the same polarity, network RL causes two transistors ($T_1$, $T_2$ or $T_3$, $T_4$) in opposite arms of the bridge structure to conduct in the presence of a control pulse b, thereby energizing the ungrounded bridge terminal A with either positive or negative battery voltage +E, −E. In the intervals between pulses b, only one transistor ($T_1$ or $T_3$) remains conductive and the current flowing through that transistor, inductance L and load Z (shunted by capacitance C) passes through the diode ($D_4$ or $D_2$) of an adjoining bridge arm connected to the same battery pole as the conducting transistor.

During time interval $t_0$–$t_1$, as shown in the first row of Table 2, transistors $T_3$ and $T_4$ are cut off while transistor $T_1$ is saturated and transistor $T_2$ conducts intermittently, in the presence of control pulses b. While transistor $T_2$ is conducting, current flows from terminal A through inductance L and load Z to grounded terminal B and thence through transistor $T_1$, battery E and transistor $T_2$ back to terminal A, thus driving point A positive. On the other hand, if transistor $T_2$ is nonconductive, current flows from point A through inductance L and load Z to point B and thence through transistor $T_1$ and diode $D_4$ back to point A, the latter being effectively grounded.

When voltage $V_u$ and current $I_u$ are both negative (interval $t_2$–$t_3$), as shown in the second row of Table 2, transistors $T_1$ and $T_2$ are cut off whereas transistor $T_3$ is continuously saturated and transistor $T_4$ conducts in the presence of any pulse b. Current then flows from terminal B (ground) through load Z and inductance L to terminal A and thence through transistor $T_4$, d-c source E and transistor $T_3$ back to terminal B, whereby point A is driven negative. During the pauses between pulses b, terminal A is again effectively grounded as current flows from point B through load Z and inductance L to point A and thence through diode $D_2$ and transistor $T_3$ back to point B.

With positive output voltage $V_u$ and negative output current $I_u$ (interval $t_1$–$t_2$), as shown in the third row of Table 2, only transistor $T_4$ conducts in the absence of a pulse b whereby terminal A is again grounded via diode $D_1$. Upon the energization of lead 4, all four transistors $T_1$–$T_4$ are cut off with the result that the current flowing through inductance L is bucked by the supply voltage E as it passes from terminal A via diode $D_2$ to the positive battery pole and thence from the negative battery pole by way of diode $D_1$ to ground on terminal B. This has been indicated in graph (c) of FIG. 8 by a shaded positive pulse.

Analogously, when voltage $V_u$ is negative while current $I_u$ goes positive (interval $t_3$–$t_4$), as shown in the fourth row of Table 2, terminal A is grounded via diode $D_3$ and conducting transistor $T_2$ in the absence of a pulse b whereas energization of lead 4 cuts off all four transistors whereby the current flows from inductance L via load Z, terminal B and diode $D_3$ to the positive battery pole and thence from the negative pole via diode $D_4$ to terminal A. The bucking voltage in this path has been indicated in FIG. 8, graph (c), by a shaded negative pulse.

It will thus be seen that, with the arrangement disclosed, the load circuit including filter $PB_2$ is never interrupted but is always closed through a low-impedance loop (the internal resistance of source E being considered negligible).

If closure of switch S occurs during a positive half-cycle of the stepped-down oscillator frequency $f_o$, the conditions are those indicated for the instant $t_1$ in the fifth row of Table 2, with transistor $T_1$ saturated and transistor $T_2$ conducting intermittently as during time interval $t_0$–$t_1$. If start-up takes place in the course of a negative half-cycle, the conditions correspond to those of instant $t_3$ represented in the bottom row of Table 2, with transistor $T_3$ saturated and transistor $T_4$ intermittently conductive as during time interval $t_2$–$t_3$. This start-up phase persists until the output current $I_u$ has built up to the threshold of discriminator PC, with consequent de-energization of lead 6 or 7 and resulting conduction of NAND gate $G_5$ in FIG. 5.

As will be apparent from the foregoing description, the sinusoidal output voltage $V_u$ has positive and negative peaks substantially equal to $+E$ and $-E$ so that its overall amplitude swing equals approximately twice the voltage of d-c source E. Moreover, this output voltage is independent of any variations in the operating voltage of oscillator OS or frequency divider DV.

We claim:

1. A generator of sinusoidal signal currents, comprising:
    oscillation-generating means for producing a fundamental sine wave;
    modulator means connected to said oscillation-generating means for converting said sine wave into a sequence of unipolar constant-amplitude control pulses varying in width with the amplitude of said sine wave, the cadence of said control pulses being substantially higher than the frequency of said sine wave;
    a source of direct current;
    switchover means connected across said source;
    logical circuitry with input connections to said modulator means and to said oscillation-generating means and with output connections to said switchover means for operating the latter to produce a train of driving pulses of constant amplitude synchronized with said control pulses and of a polarity reversing with alternate half-cycles of said sine wave; and
    a load circuit connected to said switchover means for energization by said driving pulses, said load circuit including low-pass filter means for deriving from said driving pulses a sinusoidal output voltage in step with said sine wave and a sinusoidal output current offset by a load-dependent phase angle from said output voltage, said switchover means providing a flow path for said output current under all operating conditions.

2. A generator as defined in claim 1 wherein said input connections include voltage-sensing means connected to said oscillation-generating means for determining the instantaneous polarity of said sine wave, further comprising current-sensing means connected to said load circuit for detecting the instantaneous polarity of said output current, said current-sensing means being connected to said logical circuitry for modifying the operation of said switchover means during periods of opposite polarities of said output voltage and output current.

3. A generator as defined in claim 2 wherein said switchover means comprises a bridge with four arms each including a transistor and a diode in antiparallel relationship therewith, said bridge circuit having a first diagonal connected across said source and a second diagonal connected across said load circuit, said output connections comprising four leads extending to respective input electrodes of said transistors for selectively blocking and unblocking same in the presence of said control pulses and in response to different combinations of polarity-discriminating signals from said voltage-sensing and current-sensing means.

4. A generator as defined in claim 3 wherein said logical circuitry comprises a set of coincidence gates receiving said control pulses and said polarity-discriminating signals for continuously unblocking a first of said transistors during a first time interval in which said output voltage and said output current are both positive, unblocking a second of said transistors diagonally opposite the first transistor during said first time interval in the presence of a control pulse, continuously unblocking a third of said transistors during a second time interval in which said output voltage and said output current are both negative, unblocking the fourth of said transistors diagonally opposite the third transistor during said second time interval in the presence of a control pulse, blocking all said transistors in the presence of a control pulse during a third time interval in which said output voltage is positive while said input voltage is negative and during a fourth time interval in which said output voltage is negative while said output current is positive, unblocking only said fourth transistor in the absence of a control pulse during said third time interval, and unblocking only said second transistor in the absence of a control pulse during said fourth time interval.

5. A generator as defined in claim 4 wherein said current-sensing means comprises a pair of binary comparators connected across a current-monitoring resistor in said load circuit for respectively emitting a positive-polarity signal and a negative-polarity signal.

6. A generator as defined in claim 5 wherein said comparators have thresholds resulting in the simultaneous emission of said positive-polarity and negative-polarity signals upon said load current being substantially zero whereby a pair of diagonally opposite transistors of said bridge circuit are unblocked in the presence of a control pulse during a start-up phase.

7. A generator as defined in claim 1 wherein said oscillation-generating means comprises a pilot oscillator connected to a first circuit branch for producing said fundamental sine wave and to a second circuit branch for producing a triangular carrier wave whose frequency is a multiple of that of said sine wave, said modulator means having inputs respectively connected to said first and second circuit branches.

8. A generator as defined in claim 7 wherein said pilot oscillator is a square-wave generator, said first circuit branch comprising a frequency divider, a low-pass filter stage and a rectifier in cascade, said second circuit branch comprising an integrator, said modulator means being a binary comparator.

9. A generator as defined in claim 8 wherein said first circuit branch further includes voltage-stabilizing means inserted between said filter stage and said rectifier and provided with a feedback connection to said load circuit.

10. A generator as defined in claim 1 wherein said sine wave has a frequency on the order of 25 Hz.

* * * * *